March 29, 1955
N. A. PALMGREN
2,705,176
SHEET METAL ROLLER CAGE
Filed Oct. 6, 1949
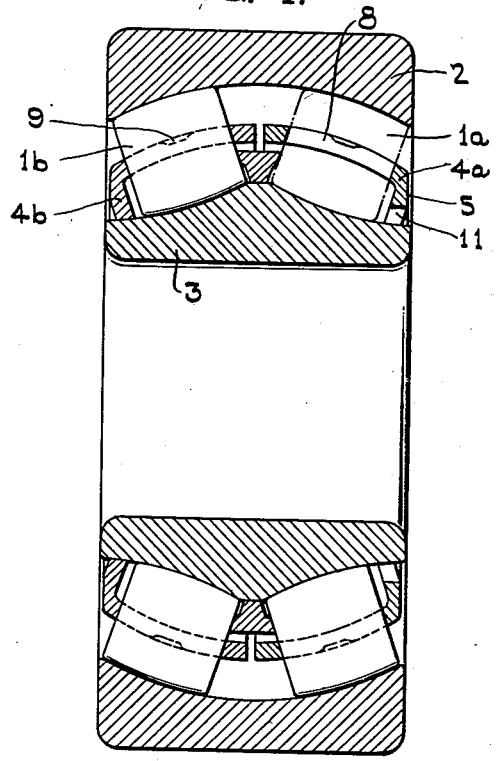
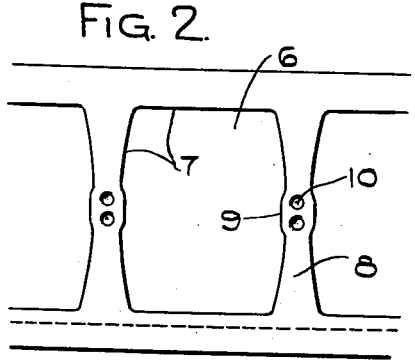
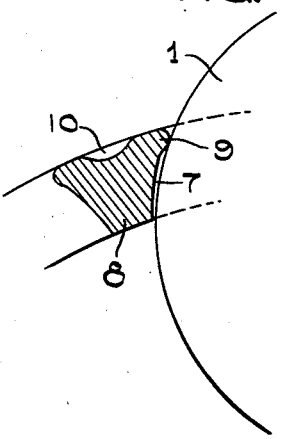
Inventor:
Nils Arvid Palmgren
by his Attorneys
Howson & Howson

United States Patent Office 2,705,176
Patented Mar. 29, 1955

2,705,176

SHEET METAL ROLLER CAGE

Nils Arvid Palmgren, Goteborg, Sweden, assignor, by mesne assignments, to SKF Industries, Inc., Philadelphia, Pa., a corporation of Delaware Application October 6, 1949, Serial No. 119,820

Claims priority, application Sweden October 13, 1948

3 Claims. (Cl. 308—217)

In radial roller bearings having cages with window-like pockets fitting the rollers at their median axial planes into which the rollers are inserted radially, special arrangements must be made to retain the rollers in the pockets, so that the set of rollers and one of the bearing rings may be handled as a unit. This is especially difficult when the cages are of sheet metal, since the material from which the cage is made is so relatively thin. In known designs of this kind it has been common to provide a tongue of the sheet material which is bent out from the side of the pocket and shaped to fit the rolling surface of the roller and permit the roller to be inserted by springing the tongue.

This device has considerable disadvantages, not only because the tools and operations for making the cage are complicated, but also because the resilient tongue becomes worn mainly at its root and finally becomes entirely parted from the cage with catastrophal results to the bearing.

According to the present invention the projections which retain the roller are made rigid so that they do not give under the pressure from the rollers, the necessary yield taking place in the cross-bars remaining between the pockets, the cross-bars being made relatively narrow for this purpose. The projections are local elevations from the side surfaces of the pockets, at or near the edges of the metal and at or near the middles of the cross-bars.

The invention is illustrated in the accompanying drawing in which Fig. 1 shows a section through a spherical roller bearing having a cage according to one form of the invention. Figs. 2 and 3 show details of the cage, Fig. 2 being a view in a radial direction and Fig. 3 being a section in a radial plane.

The rollers 1 are arranged in two rows between an outer ring 2 and an inner ring 3. Each row of rollers has a cage 4 of pressed sheet metal, the main part of which is in the shape of a spherical zone and is provided at its outer side with an inwardly directed flange 5 for centering the cage on the inner ring. Pockets 6 are stamped out of the cage to fit the shape of the roller in its axial plane. The sides 7 of each pocket which are turned towards the roller may be described in a geometrical sense as being generated by straight lines parallel with each other so that the roller can move freely radially. The pockets are located so near to each other that the cross-bars 8 between them are comparatively narrow and give at their middles under load.

At the outer edge of the middle of each bar is a local projection 9, as shown in Fig. 3, which protrudes beyond the side surface of the pocket and which is made by a local plastic deformation of the material, which in this case is caused by making indentations 10 on the outer side of the bar near its middle. The projections 9 prevent the roller from falling out of the cage of its own weight if the inner ring 3 and the set of rollers is swung out relative to the outer ring 2. On the other hand the rollers can be forced out of the pockets by springing the cross-bars 8.

Notches 11 are provided in the centering edge of the flange 5 through which a tool can be inserted for removing the rollers by overcoming the pressure of the bars.

Having thus described my invention I claim and desire to secure the following by Letters Patent:

1. A sheet metal cage for the rollers of radial roller bearings, said cage having individual roller pockets separated by crossbars, said crossbars having local rigid roller-retaining bosses at or near the middle thereof projecting approximately circumferentially of the cage from the sides of the crossbars into the pocket spaces so as to restrict the effective openings between the crossbars, and said crossbars being elastically deformable to an extent permitting admission of the rollers to the pockets through said openings by flexure of the crossbars without deformation of said bosses.

2. A roller cage according to claim 1 having a cage-centering flange and a notch in the flange for insertion of a dismantling tool.

3. In a radial roller bearing comprising an annular row of rollers between radially disposed inner and outer race rings, a sheet metal cage having individual radial pockets for said rollers within which the rollers are confined between the cage and the said inner ring, crossbars forming the side walls of said pockets and having local rigid bosses at the approximate middles of the crossbars, said bosses projecting approximately circumferentially of the cage from the sides of the crossbars into the pocket spaces and restricting the effective roller-receiving openings between the crossbars to an extent such that the said openings are lesser in width than the diameters of the rollers in the part adjoining said bosses, and said crossbars being elastically deformable to an extent permitting admission of the rollers to the said pockets through said openings by flexure of the crossbars without deformation of said bosses.

References Cited in the file of this patent
UNITED STATES PATENTS

| | | |
|---|---|---|
| 1,668,112 | Gibbons | May 1, 1928 |
| 1,765,648 | Bott | June 24, 1930 |
| 2,122,365 | Beck | June 28, 1938 |
| 2,359,120 | Kilayin | Sept. 26, 1944 |
| 2,382,975 | Coddington | Aug. 21, 1945 |

FOREIGN PATENTS

| | | |
|---|---|---|
| 296,217 | Great Britain | Aug. 30, 1928 |